United States Patent
Benson

(10) Patent No.: US 7,747,649 B2
(45) Date of Patent: *Jun. 29, 2010

(54) USE OF BROWSER COOKIES TO STORE STRUCTURED DATA

(75) Inventor: Eric A. Benson, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/500,496

(22) Filed: Jul. 9, 2009

(65) Prior Publication Data

US 2009/0271414 A1  Oct. 29, 2009

Related U.S. Application Data

(60) Division of application No. 12/127,599, filed on May 27, 2008, now Pat. No. 7,660,816, which is a continuation of application No. 10/694,509, filed on Oct. 27, 2003, now abandoned, which is a continuation of application No. 09/494,712, filed on Jan. 31, 2000, now Pat. No. 6,714,926.

(60) Provisional application No. 60/118,266, filed on Feb. 2, 1999.

(51) Int. Cl.
G06F 17/30 (2006.01)
(52) U.S. Cl. .................................... 707/791
(58) Field of Classification Search ................ 707/10, 707/100, 101, 102, 104.1; 705/14, 26; 709/216; 715/210; 717/147; 726/3
See application file for complete search history.

(56) References Cited

U.S. PATENT DOCUMENTS

| | | | |
|---|---|---|---|
| 5,774,670 A | 6/1998 | Montulli | |
| 5,826,242 A | 10/1998 | Montulli | |
| 5,848,396 A | 12/1998 | Gerace | |
| 5,907,847 A | 5/1999 | Goldberg | |
| 5,907,848 A * | 5/1999 | Zaiken et al. | 707/202 |
| 5,960,200 A * | 9/1999 | Eager et al. | 717/147 |
| 5,978,840 A * | 11/1999 | Nguyen et al. | 709/217 |
| 5,991,878 A * | 11/1999 | McDonough et al. | 726/9 |
| 6,041,309 A * | 3/2000 | Laor | 705/14.26 |
| 6,073,241 A * | 6/2000 | Rosenberg et al. | 726/3 |
| 6,085,224 A | 7/2000 | Wagner | |
| 6,249,795 B1 * | 6/2001 | Douglis | 715/210 |
| 6,330,566 B1 * | 12/2001 | Durham | 707/104.1 |
| 6,374,359 B1 | 4/2002 | Shrader et al. | |
| 6,714,926 B1 * | 3/2004 | Benson | 707/2 |
| 2001/0010722 A1 | 8/2001 | Enari | |
| 2001/0053979 A1 | 12/2001 | Kori | |

OTHER PUBLICATIONS

Stonebraker, M., "Managing Persistent Objects In a Multi-Level Store," Proceedings of the 1991 ACM SIGMOD International Conference on Management of Data, May 1991. (of-reord in the parent application).

* cited by examiner

Primary Examiner—Diane Mizrahi
(74) Attorney, Agent, or Firm—Knobbe, Martens, Olson & Bear LLP

(57) ABSTRACT

A system and process are disclosed for encoding selected data structures in browser cookies. The data structures may contain a variety of different types of data elements, including N-bit integers and other non-character elements. A version tracking scheme provides forward and backward compatibility between client and server software. The process is implemented without the need for any browser extensions, and without the need for users to download any special code to their computers.

21 Claims, 3 Drawing Sheets

USE OF BROWSER COOKIES TO STORE STRUCTURED DATA

RELATED APPLICATIONS

This application is a division of U.S. application Ser. No. 12/127,599, filed May 27, 2008, which is a continuation of U.S. patent application Ser. No. 10/694,509, filed Oct. 27, 2003, which is a continuation of U.S. patent application Ser. No. 09/494,712, filed Jan. 31, 2000 (now U.S. Pat. No. 6,714,926), which claims the benefit of U.S. provisional application No. 60/118,266, filed Feb. 2, 1999.

FIELD OF THE INVENTION

The present invention relates to Web site customization using cookies, and more particularly, to a method of extending the functionality of cookies to increase Web site performance.

BACKGROUND

Commercially available Web browsers such as Internet Explorer and Netscape Navigator support a mechanism by which a Web server can store persistent information on a user's machine for subsequent retrieval. This information is commonly referred to as a "cookie," and typically includes information about the user's identity. The cookie is stored on the user's computer as a name-value pair (NAME=VALUE), together with a URL (or range of URLs) to which the cookie corresponds and an optional expiration date. When the user initiates a request for a URL that corresponds to the cookie, the browser automatically sends the cookie (and any other cookies that correspond to the requested URL) to the host Web server with the URL request.

One common application for cookies involves dynamically customizing Web pages and functions for known users of a Web site. Typically, this involves storing known information about the user, such as a user ID, on the user's computer in response to a page request. When the user subsequently accesses the Web site, the information contained within the cookie is used to access a back-end database to retrieve additional information about the user, such as the user's preferences or account information. This database information may then be used to customize the requested Web page.

One problem with the above approach is that it requires frequent accesses to the database. For Web sites that experience many thousands of hits per day, the need to access the database can produce a significant performance degradation. The performance degradation may be the result of a limited load capacity of the database system, increased network traffic between physical Web servers and the database system, or both.

SUMMARY

One potential solution to the above problem would be to store within cookies all of the user information needed to customize the Web pages, or at least the most frequently accessed Web pages. This would allow accesses to back-end databases during page requests to be reduced or avoided. Unfortunately, the existing cookies specification does not provide a mechanism for storing non-character data. Thus, for example, where the database information used to customize Web pages includes a list or table of 16-bit integers, storing such data within browser cookies is not a viable option. Further, the existing cookies specification does not provide a mechanism for allowing server software to keep track of versions of data elements contained within cookies.

The present invention overcomes this problem by providing a server system and process for storing selected data structures within browser cookies, preferably using a version tracking scheme to provide forward and backward compatibility between client and server software. The data structures may contain a variety of different types of data elements, including N-bit integers and other non-character elements. The process is implemented without the need for any browser extensions, and without the need for users to download any special code to their computers.

In a preferred embodiment, the system uses a schema file or other data structure that specifies past and present schemas for encoding data structures within cookies. A first server component uses the schema file to encode data structures into character strings that are stored within cookies on user computers. A checksum value, a length field, and a schema version number are also preferably encoded within the cookies. A second server component receives cookies from user computers, uses the schema file to identify the types of data structures stored in such cookies, and reproduces the data structures in local memory for temporary use. Application software uses these temporary data structures to generate personalized web pages and/or perform other custom operations.

DETAILED DESCRIPTION OF A PREFERRED EMBODIMENT

A preferred embodiment of the process and associated components will now be described with reference to FIGS. 1-3. Throughout these figures and the associated description, reference will be made to various implementation-specific details such as specific data types, algorithms, rules and conventions. These and other details are provided in order to illustrate an example implementation, and not to limit the scope of the invention.

Figure 1:
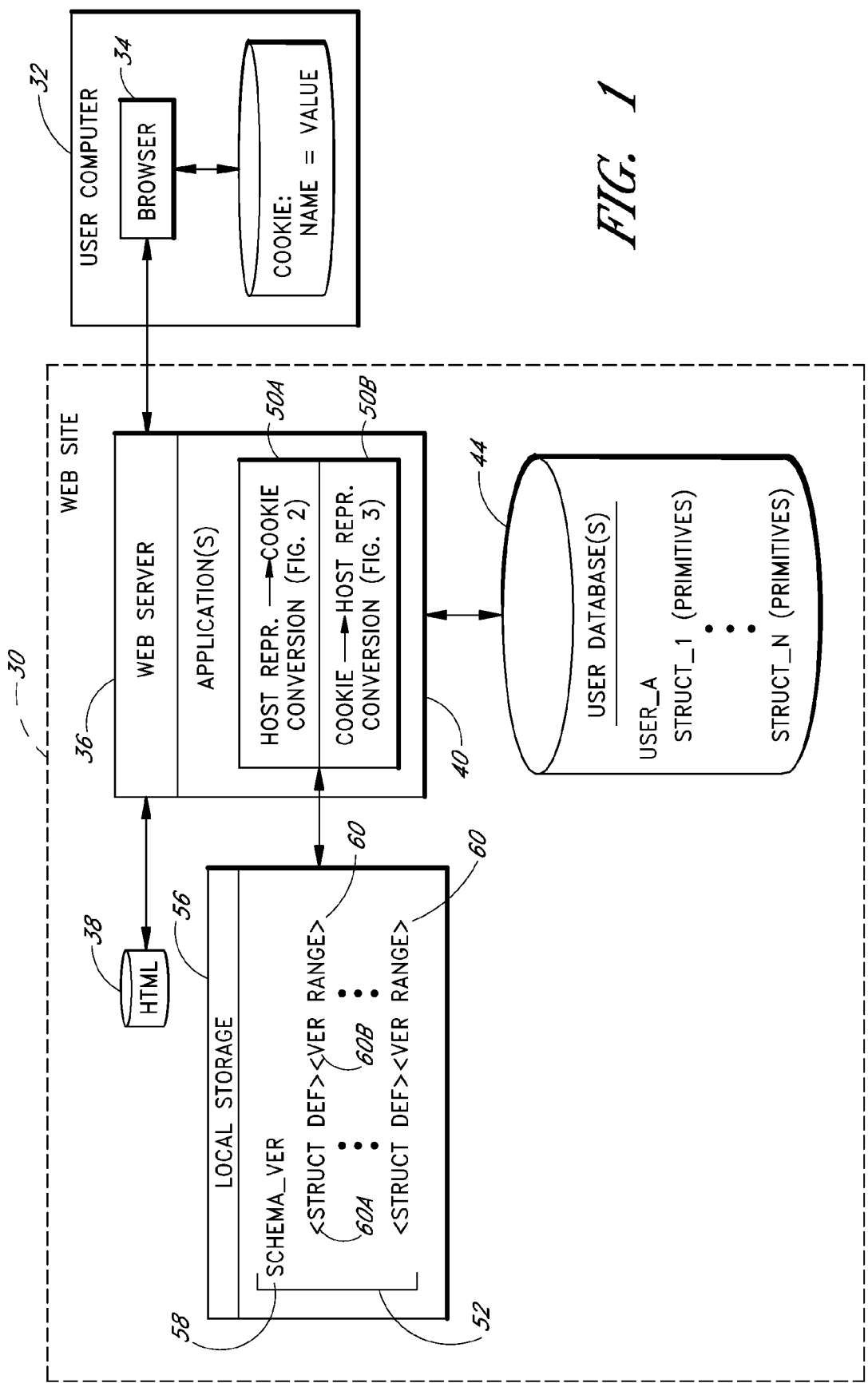
FIG. 1 illustrates a Web site system according to a preferred embodiment of the invention.

FIG. 1 illustrates a Web site system ("Web site") 30 according to a preferred embodiment of the invention, and illustrates a representative user computer 32 that communicates with the Web site via the Internet. For purposes of illustration, it may be assumed that the Web site 30 is the Amazom.com Web site. The user computer includes a Web browser 34, such as Microsoft Internet Explorer 4.0, that supports cookies.

The Web site 30 includes a Web server 36 which accesses a store 38 of HTML (Hypertext Markup Language) documents. The Web site also includes one or more applications 40 that are used to dynamically generate customized Web pages for users. The Web server 36 and the applications 40 may, for example, run on one or more physical servers of the Web site.

As depicted by FIG. 1, the applications 40 access one or more databases or other repositories 44 (collectively "user database") that contain information about known users of the site. In the context of the Amazon.com site, this information may include, for example, user names and identifiers, payment and shipping information, shopping preference information (e.g., 1-Click settings), shopping cart contents, group discount information, product recommendations, user purchase histories, and service data (e.g., BookMatcher ratings). Different items within the user database 44 may be used by the applications 40 to customize different Web pages or functions.

The information stored in the user database 44 for each user is in the form of multiple structures, STRUCT_1 through STRUCT_N. The structures may include, for example, lists, tables, arrays, variables, records, and other types of elements. Each structure includes one or more primitives, where a primitive is a data element that does not include a reference to another data element. For purposes of illustration, it may be assumed that some of these primitives are in the form of non-character elements (such as 16-bit and 32-bit integers) that are used to customize frequently-accessed Web pages.

Previously, the process of dynamically customizing Web pages for users has required the applications 40 to frequently access the user database 44. For example, when a known user would request the site's home page, information contained within the cookie (or cookies) transmitted with the URL request would be used to look up in the database 44 the user's name and certain preference information; this information would then be used to generate the home page. As described above, such frequent accesses to back-end databases can significantly degrade performance as seen by end users.

In accordance with the invention, the following additional components are provided to reduce the need for accesses to the user database 44. These components include a host representation to cookie conversion module 50A ("host-to-cookie module"), a cookie to host representation conversion module 50B ("cookie-to-host module"), and a schema file 52. The conversion modules 50A, 50B may be in the form of executable functions that can be called by the applications.

The schema file 52, which may alternatively be in the form of a table or other data structure, specifies the user database structures that have been selected (typically by application developers) to be included within cookies. (The term "schema," as used herein, refers generally to the pattern or arrangement of a collection of data elements.) Typically, the structures that are included are those which contain relatively static user data that is used to customize frequently-accessed Web pages. As described below, information about structures that are no longer in use (due to application design changes) is retained within the schema file to support backward and forward compatibility. The schema file 52 thus acts as a specification of past and present schemas used to generate cookies.

The schema file 52 is preferably stored in local storage 56 of the physical server(s) that run the applications 40. For example, where the applications are replicated across multiple physical servers, the schema file 52 may be stored on the hard drive of each such server, and may be cached in the server's RAM to increase performance.

In operation, the conversion modules 50A, 50B perform the task of converting selected structures of the user database 44 (preferably those used for the customization of popular Web pages) between the host representation and a cookie representation. During the cookie generation process, the host-to-cookie conversion module 50A is invoked to convert selected database structures for a particular user into a cookie to be stored on the user's computer; during this process, the schema file 52 is accessed to determine which of the specific structures (or primitives thereof) are to be included within the cookie.

When the cookie is subsequently returned with a URL request, the cookie-to-host module 50B is invoked to convert the cookie back to the host representation used by the applications 40. During the decoding process, the schema file 52 is used to determine the content and format of the embedded structure data. In addition, the schema file 52 is used to determine whether any of the structures contained within the cookie is no longer valid; if any such structure exists, it need not be fully decoded. The structures that are extracted from the cookie are stored in local storage 56 while they are used by the applications 44, and are then deleted. Typically, the extracted information is used to customize one or more Web pages, but the information could also or alternatively be used to perform other types of user-specific functions (e.g., authentication).

In one implementation of the disclosed system, structures that use primitive datatypes of 8, 16, and 32 bit integers and null-terminated ASCII strings are supported. In other implementations of the disclosed design, more complex structures such as nested or cross-referenced structures could be stored.

The content of the schema file 52 will now be described in further detail with reference to FIG. 1. As illustrated, the schema file 52 includes a global schema version number 58 (SCHEMA_VER) which, as described below, is incremented when certain types of changes are made to the schema. The schema file 52 also includes a sequence of structure entries 60, each of which corresponds to a particular database structure that has been selected for inclusion. Each entry 60 includes a structure definition portion 60A and a valid version range portion 60B. The structure definition portion 60A contains the metadata for the corresponding structure, including a list of the primitive fields of the structure and their datatypes and address offsets.

The valid version range 60B specifies the range of schema version numbers for which the corresponding structure is valid, and consists of an upper bound and a lower bound. Since the deletion of a structure is rarely planned in advance, the upper bound of the valid version range 60B for a structure is preferably set to be unlimited. As discussed below, a structure can be retired by incrementing the global schema version number 58 and setting the upper bound of the valid version range 60B of the structure to be less than the new global version number.

To support the ability to read both old and new cookies, the schema file 52 is modified according to the following set of rules.

1. The set of data elements specified within a structure definition 60A cannot be modified.

2. No insertions into, or deletions from, the sequence of structure entries 60 are permitted.

3. A new structure can be added to the schema by adding a new entry 60 to the sequence and incrementing the global schema version number.

4. To retire a structure, the upper bound of the structure's version range 60B is set to the current global version number 58, and all deployed application software is updated to reflect this change. The global version number 58 is then incremented.

These rules may be followed "by hand" by developer(s) during manual editing of the schema file 52. Alternatively, a special management layer could be provided which enforces these rules.

Figure 2:
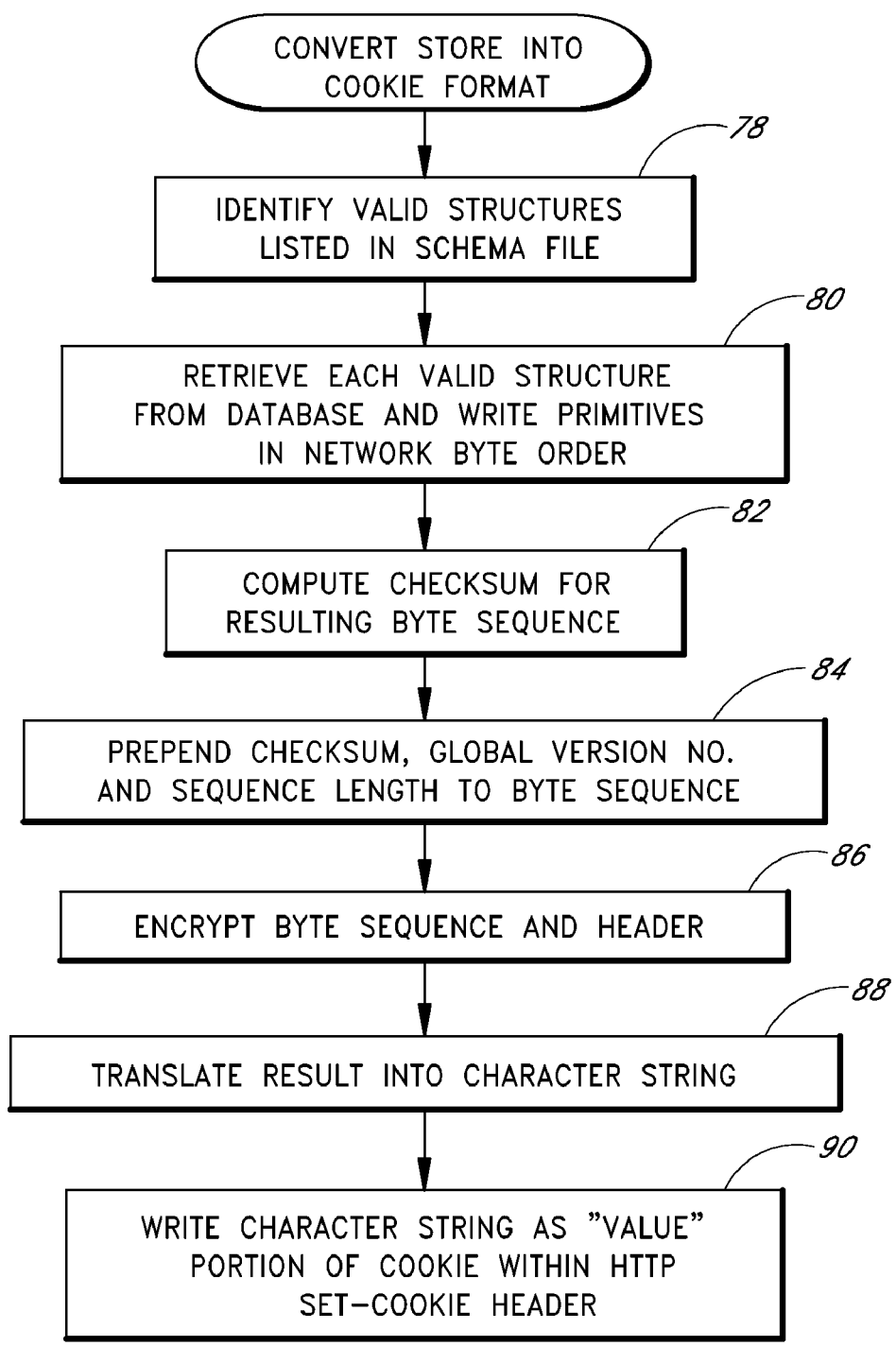
FIG. 2 illustrates a preferred sequence of steps that are implemented by the host-to-cookie module of FIG. 1 to translate a sequence of structures to a cookie format.
Figure 3:
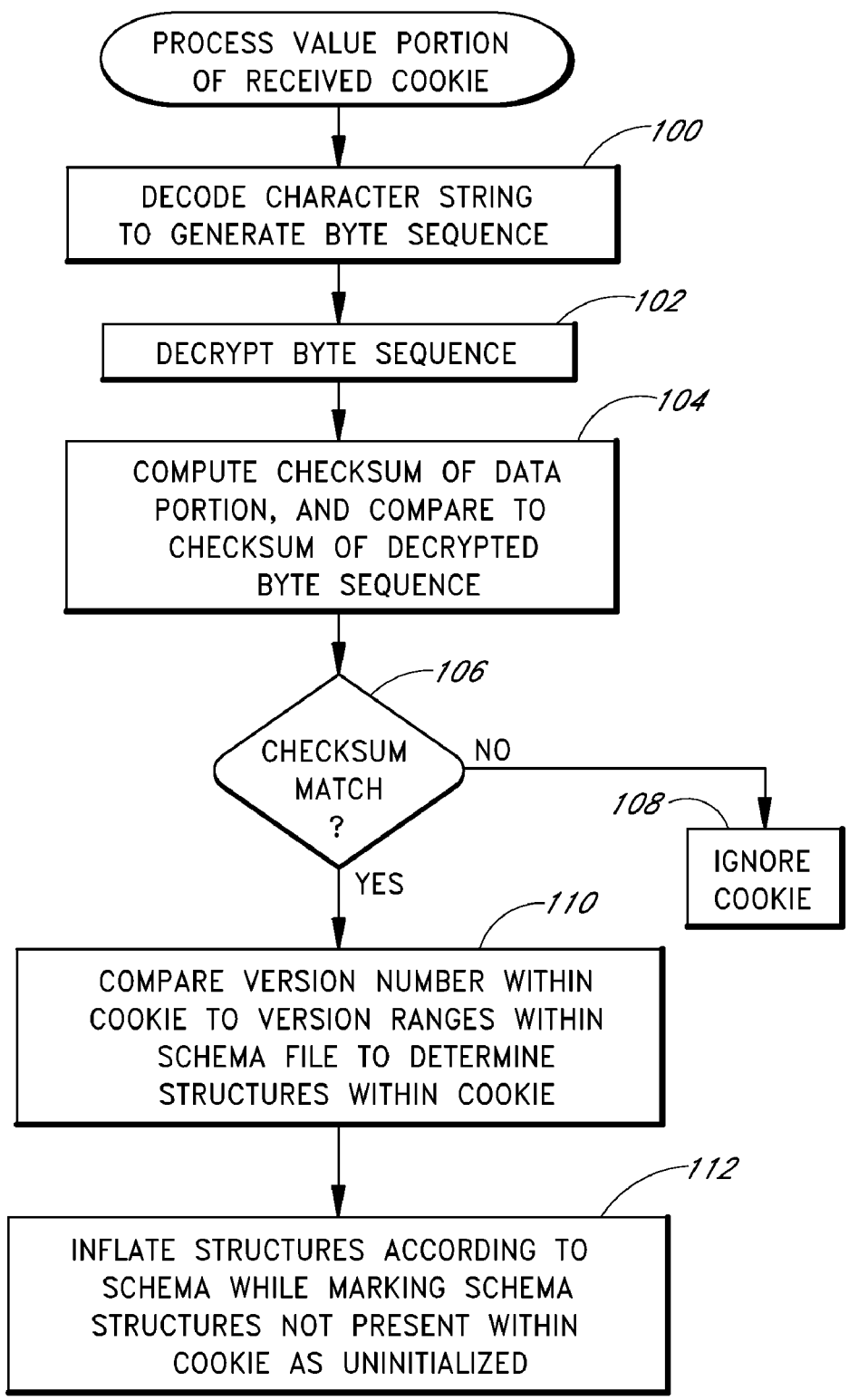
FIG. 3 illustrates a preferred sequence of steps that are implemented by the cookie-to-host conversion module of FIG. 1 to convert a character string back to the original host representation.

FIG. 2 illustrates a preferred sequence of steps that are implemented by the host-to-cookie module 50A to translate the sequence of structures to a cookie format. All but the final step 90 of this process can optionally be performed in an off-line mode, rather than in response to a URL request, to reduce the delay experienced by the user.

The first step 78 of the process involves accessing the schema file 52 to identify the structures to be included within the cookie. This involves identifying the structures listed in the schema file 52 that are currently valid (i.e., have a valid version number range 60B which includes the global schema version number 58).

In step 80, each valid structure is read from the user database 44, and the primitive elements of the structure are sequentially written in their network byte order. Conventional NTOHL and HTONL families of functions may be used for this purpose. Putting the primitives in network byte order allows machines having different endian architectures to be used for generating and decoding cookies. The result of step 80 is a variable-length sequence of bytes which represents the primitive elements of the valid structures.

In step 82, a checksum is computed for the resulting sequence of bytes. A 32-bit checksum may be used for this purpose. The checksum provides a mechanism for later determining whether the cookie has been modified. The checksum, global version number 58, and the length of the sequence are then prepended or otherwise attached to the byte sequence (step 84), with these values being again written in network byte order. In step 86, the resulting sequence is encrypted using a standard encryption library (not shown).

As indicated by step 88, the resulting, encrypted byte sequence is then translated into a character string. This is preferably accomplished by dividing the sequence of bytes into a sequence of six-bit values (padding the sequence as needed to provide even divisibility), and converting each six-bit value into a base-64 digit. The character set used for this purpose consists of the numbers 0-9, all upper-case and lower-case alphabetical characters, and the characters "@" and "?." Any of a variety of other character sets and conversion schemes could be used for this purpose.

Finally, in step 90, the resulting character string is written to the corresponding user's computer 32 as the value portion of a cookie. As is conventional, the cookie is written by including a Set-Cookie header within an HTTP response to the browser 34. The user's structures that are written to the cookie are preferably retained within the user database 44, but could alternatively be deleted to reduce server storage burden.

When the cookie is subsequently transmitted to the Web server 36 as part of a URL request, the cookie-to-host conversion module 50B applies the above steps in reverse order to convert the character string back to the original host representation. As depicted by FIG. 3, the first step 100 of this process involves decoding the character string to reproduce the encrypted byte sequence. The encrypted byte sequence is then decrypted (step 102) using the same encryption library and key used for encryption. At this point, the length, version number, checksum and data are available in network byte order.

As represented by step 104, a checksum is then computed for the extracted data portion, and this checksum is compared to the extracted checksum to determine whether the cookie value was modified. If a mismatch occurs, the cookie is ignored (steps 106 and 108); in this event, the user database 44 may be accessed to retrieve the desired user data.

Otherwise, the structures are "inflated" to their host representation according to the information contained within the schema file, and are written to local storage 56 (steps 110 and 112) for use by the applications. During this process, the version number contained within the cookie is compared to the valid version ranges 60B of the schema file 52 (step 110). If the version number is within or exceeds the valid range of a schema entry 60, that structure is inflated from the byte structure; otherwise, there is no data stored within the cookie for that structure, and the structure is skipped and marked as uninitialized (step 112).

The above scheme allows values stored in old versions of cookies to be read by new versions of application software. If the cookie predates the addition of a structure to the end of the schema sequence, that structure is simply marked as uninitialized so that it can be treated as such by the new application software. If a structure has been deactivated (retired), the data from an old cookie will still be read but may then be ignored by the new application software. Further, cookies associated with new versions of application software can be read by old versions of the software.

As will be appreciated by the foregoing, the schema used to generate each cookie could alternatively be incorporated into that cookie. Doing so, however, increases the cookie size, and can decrease performance. The above-described approach of keeping track of the current and past schemas in a schema file or other server data structure is therefore preferred. It will also be recognized that the information stored within the schema file 52 could be distributed across multiple different files or data structures and/or represented in a different form.

Although this invention has been described in terms of certain preferred embodiments, other embodiments that are apparent to those or ordinary skill in the art are also within the scope of this invention.

What is claimed is:

1. A computer-implemented method, comprising:
by a server system comprising one or more physical servers:
reading a data structure from a database, said data structure comprising a plurality of primitives, each primitive being a non-character data element that does not include a reference to another data element, said plurality of primitives arranged in a particular order;
encoding the data structure, including the plurality of primitives, in a character string, wherein encoding the data structure in the character string comprises incorporating the primitives of the data structure into a variable-length sequence of bytes, and converting the variable-length sequence of bytes into said character string;
sending the character string to a user computer;
subsequently, receiving the character string from the user computer with a Uniform Resource Locator (URL) request;
reproducing the data structure, including said plurality of primitives arranged in said particular order, in computer memory from the received character string; and
using the reproduced data structure in said computer memory to generate a response to the URL request.

2. The method of claim 1, wherein converting the variable-length sequence of bytes into said character string comprises encoding into the character string (1) a length value that specifies a length of the variable-length sequence of bytes, and (2) a checksum value capable of being used to verify the integrity of the variable-length sequence of bytes.

3. The method of claim 1, wherein the method comprises using non-executable schema data to encode the data structure in the character string and to reproduce the data structure from the character string.

4. The method of claim 3, wherein the non-executable schema data includes metadata for said data structure, said metadata identifying primitive fields of the data structure, and specifying data types and address offsets of said primitive fields.

5. The method of claim 1, wherein converting the variable-length sequence of bytes into said character string comprises encoding into the character string a length value that specifies a length of the variable-length sequence of bytes.

6. The method of claim 1, wherein the data structure comprises at least one of the following types of primitives: 8-bit integers, 16-bit integers, 32-bit integers.

7. The method of claim 1, in which the data structure is an array.

8. The method of claim 1, in which the data structure is a table.

9. The method of claim 1, in which the data structure is a record.

10. The method of claim 1, in which the data structure is a list.

11. The method of claim 1, in which the data structure is a nested structure.

12. The method of claim 1, wherein the method comprises encoding multiple data structures in the character string.

13. The method of claim 1, wherein the method is performed by execution of instructions by a web server.

14. A computer system programmed to perform a method that comprises:
   reading a data structure from a database, said data structure comprising a plurality of primitives, each primitive being a non-character data element that does not include a reference to another data element, said plurality of primitives arranged in a particular order;
   encoding the data structure, including the plurality of primitives, in a character string, wherein encoding the data structure in the character string comprises incorporating the primitives of the data structure into a variable-length sequence of bytes, and converting the variable-length sequence of bytes into said character string;
   sending the character string to a user computer;
   subsequently, receiving the character string from the user computer with a Uniform Resource Locator (URL) request;
   reproducing the data structure, including said plurality of primitives arranged in said particular order, in computer memory from the received character string; and
   using the reproduced data structure to generate a response to the URL request;
   said computer system comprising a physical server.

15. The computer system of claim 14, in which the computer system is programmed to convert the variable-length sequence of bytes into said character string at least in part by encoding into the character string (1) a length value that specifies a length of the variable-length sequence of bytes, and (2) a checksum value capable of being used to verify the integrity of the variable-length sequence of bytes.

16. The computer system of claim 14, in which the computer system is programmed to use non-executable schema data to encode the data structure in the character string and to reproduce the data structure from the character string.

17. The computer system of claim 16, wherein the non-executable schema data includes metadata for said data structure, said metadata identifying primitive fields of the data structure, and specifying data types and address offsets of said primitive fields.

18. The computer system of claim 14, wherein the computer system is programmed to encode into the character string a length value that specifies a length of the variable-length sequence of bytes.

19. The computer system of claim 14, wherein the data structure comprises at least one of the following types of primitives: 8-bit integers, 16-bit integers, 32-bit integers.

20. The computer system of claim 14, wherein the computer system comprises a plurality of physical servers.

21. Non-transitory computer storage that stores executable program code that is configured to direct a computer system comprising one or more physical servers to perform a method that comprises:
   reading a data structure from a database, said data structure comprising a plurality of primitives, each primitive being a non-character data element that does not include a reference to another data element, said plurality of primitives arranged in a particular order;
   encoding the data structure, including the plurality of primitives, in a character string, wherein encoding the data structure in the character string comprises incorporating the primitives of the data structure into a variable-length sequence of bytes, and converting the variable-length sequence of bytes into said character string;
   sending the character string to a user computer;
   subsequently, receiving the character string from the user computer with a Uniform Resource Locator (URL) request;
   reproducing the data structure, including said plurality of primitives arranged in said particular order, from the received character string; and
   using the reproduced data structure to generate a response to the URL request.

* * * * *